(12) United States Patent
Aizawa et al.

(10) Patent No.: US 11,884,272 B2
(45) Date of Patent: Jan. 30, 2024

(54) MOTORCYCLE-DRIVE ASSISTANCE APPARATUS

(71) Applicant: Mitsubishi Electric Corporation, Tokyo (JP)

(72) Inventors: Hiroshi Aizawa, Tokyo (JP); Koki Arauchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 360 days.

(21) Appl. No.: 17/093,765

(22) Filed: Nov. 10, 2020

(65) Prior Publication Data

US 2021/0316727 A1    Oct. 14, 2021

(30) Foreign Application Priority Data

Apr. 8, 2020  (JP) ................................ 2020-069496

(51) Int. Cl.
  B60W 30/16   (2020.01)
  B60W 30/165  (2020.01)
  (Continued)

(52) U.S. Cl.
  CPC ........ B60W 30/162 (2013.01); B60W 30/165 (2013.01); B60W 40/076 (2013.01);
  (Continued)

(58) Field of Classification Search
  CPC ............. B60W 30/162; B60W 30/165; B60W 40/076; B60W 40/105; B60W 40/107;
  (Continued)

(56) References Cited

U.S. PATENT DOCUMENTS 8,352,119 B2 *  1/2013  Arai ...................... B60W 30/16
                                                   701/33.4
2005/0143895 A1 *  6/2005  Kato ..................... B60W 30/16
                                                   180/170
(Continued)

FOREIGN PATENT DOCUMENTS

JP    2014218968 A  * 11/2014
JP    2019077353 A  *  5/2019
WO    2019/186916 A1   10/2019

*Primary Examiner* — Aniss Chad
*Assistant Examiner* — Christine Nguyen Huynh
(74) *Attorney, Agent, or Firm* — Sughrue Mion, PLLC; Richard C. Turner (57) ABSTRACT

There is provided a motorcycle-drive assistance apparatus that makes rapid deceleration by an engine brake possible so that braking control unintended by a rider can be avoided. The motorcycle-drive assistance apparatus is configured in such a way that a deceleration-start inter-vehicle distance calculation unit calculates a deceleration-start inter-vehicle distance, by use of an acceleration value read from an engine-brake acceleration value storage unit, based on an own-vehicle speed calculated by an own-vehicle speed calculation unit and a road-surface gradient angle calculated by a road-surface gradient angle calculation unit and in such a way that when the inter-vehicle distance between an own vehicle and another vehicle, detected by an object detection unit, becomes smaller than the calculated deceleration-start inter-vehicle distance, deceleration of the own vehicle through the engine brake is started.

18 Claims, 4 Drawing Sheets

(51) Int. Cl.
*B60W 40/105* (2012.01)
*B60W 40/107* (2012.01)
*B60W 40/076* (2012.01)

(52) U.S. Cl.
CPC ........ *B60W 40/105* (2013.01); *B60W 40/107* (2013.01); *B60W 2510/18* (2013.01)

(58) Field of Classification Search
CPC ....... B60W 2510/18; B60W 30/18136; B60W 2300/36; B60W 2520/10; B60W 2552/15; B60W 2554/802
See application file for complete search history.

(56) References Cited

U.S. PATENT DOCUMENTS

| | | | | |
|---|---|---|---|---|
| 2009/0024354 | A1* | 1/2009 | Osaki | B60W 30/143 |
| | | | | 702/154 |
| 2012/0259527 | A1* | 10/2012 | Taguchi | B60W 30/143 |
| | | | | 701/93 |
| 2020/0391732 | A1* | 12/2020 | Kaneta | B62L 3/08 |

* cited by examiner

MOTORCYCLE-DRIVE ASSISTANCE APPARATUS

BACKGROUND OF THE INVENTION

Field of the Invention

The present disclosure relates to a motorcycle-drive assistance apparatus.

Description of the Related Art

The ACC (Adaptive Cruise Control) system for a travel following a preceding vehicle while maintaining the inter-vehicle distance between an own vehicle and the preceding vehicle is a technology that has become widespread, as a system for assisting a driver's drive, in the field of a four-wheeled vehicle. In the ACC system, the inter-vehicle distance and the relative speed between an own vehicle and a preceding another vehicle are measured by a millimeter wave radar or the like mounted in the own vehicle, and the own vehicle travels while maintaining a constant, inter-vehicle distance between the own vehicle and the preceding another vehicle. In contrast, it is the actual situation that in the case of a motorcycle, the ACC system has not become widespread to the general populace, although a technology for assisting a rider has been proposed.

For example, as a technology for assisting a motorcycle rider, Patent Document 1 has proposed a technology in which an own vehicle has a means (e.g., a millimeter wave radar) for detecting another vehicle at the rear of or alongside the own vehicle and in which based on the relative distance between the own vehicle and another vehicle detected within a region through the means, notification is stepwise provided to a rider who is the driver of the own vehicle.

PRIOR ART REFERENCE

Patent Literature

[Patent Document 1] International Publication No. WO2019/186816A1

SUMMARY OF THE INVENTION

In general, the ACC system that has become widespread in the field of a four-wheeled vehicle is configured in such a way as to automatically apply the brake in accordance with an inter-vehicle distance. In contrast, in the case of a motorcycle, when the system automatically performs braking control unintended by the rider, the probability that the driver is spilled is high because unlike a four-wheeled vehicle in which a seat belt prevents the driver from being spilled, there is mounted no equipment for that purpose; thus, it is difficult to automatically perform the braking control. Accordingly, in a drive assistance apparatus applied to a motorcycle, deceleration through an engine brake is indispensable.

Moreover, even when the brake can automatically be applied, it is required that in order to prevent the rider from being spilled, the deceleration degree of the own vehicle is made extremely small; therefore, it is conceivable that even when the brake is automatically be applied, the deceleration degree thereof is substantially equal to that of the engine brake. Furthermore, in the case of a motorcycle, when braking control is automatically performed, it is required that in order to prevent the rider from being spilled from the own vehicle, it is preliminarily detected that the rider has securely grasped the both handle grips; thus, it is required that respective sensors for detecting the foregoing matter are mounted in the handle grips. In that case, the system may become complicated and hence the costs of the vehicle may increase.

The present disclosure has been implemented in order to solve the foregoing problem; the objective thereof is to provide a motorcycle-drive assistance apparatus that makes rapid deceleration by an engine brake possible so that braking control unintended by a rider can be avoided.

A motorcycle-drive assistance apparatus disclosed in the present disclosure assists an own vehicle to follow another vehicle existing in front thereof; the motorcycle-drive assistance apparatus includes an object, detection unit that detects said another vehicle, a road-surface gradient angle calculation unit that calculates a gradient angle of a road-surface on which the own vehicle is traveling, an own-vehicle speed calculation unit that calculates an own-vehicle speed, which is a vehicle speed of the own vehicle, a deceleration-start inter-vehicle distance calculation unit that calculates a deceleration-start inter-vehicle distance between the own vehicle and said another vehicle at a time when the own vehicle starts to decelerate through an engine brake, an engine-brake acceleration value calculation unit that calculates an acceleration value of the own-vehicle, obtained through the engine brake, at a time of a driving state where the own vehicle can operate the engine brake, and an engine-brake acceleration value storage unit that stores an acceleration value calculated by the engine-brake acceleration value calculation unit. The motorcycle-drive assistance apparatus is characterized in that the deceleration-start inter-vehicle distance calculation unit reads an acceleration value corresponding to an own-vehicle speed calculated by the own-vehicle speed calculation unit and a gradient angle calculated by the road-surface gradient angle calculation unit from the engine-brake acceleration value storage unit and then calculates the deceleration-start inter-vehicle distance, and in that when an inter-vehicle distance between the own vehicle and said another vehicle becomes smaller than the deceleration-start inter-vehicle distance calculated by the deceleration-start inter-vehicle distance calculation unit, deceleration of the own vehicle through the engine brake is started.

The present disclosure makes it possible to obtain a motorcycle-drive assistance apparatus that makes rapid deceleration by an engine brake possible so that braking control unintended by a rider can be avoided.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
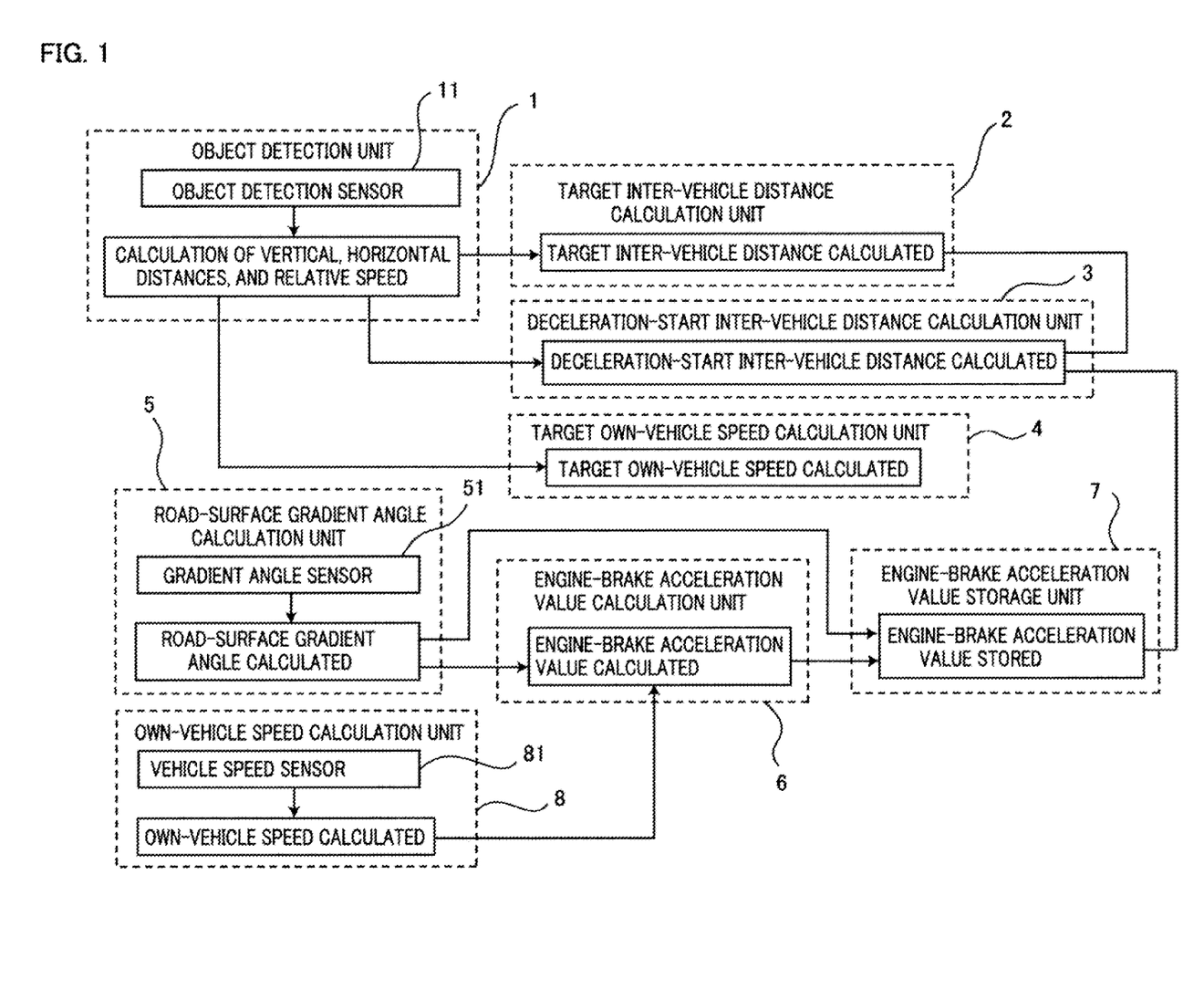
FIG. 1 is a block diagram representing a motorcycle-drive assistance apparatus according to Embodiment 1.

Hereinafter, a motorcycle-drive assistance apparatus according to Embodiment 1 will be explained with reference to the drawings. FIG. 1 is a block diagram representing a motorcycle-drive assistance apparatus according to Embodiment 1. The motorcycle-drive assistance apparatus according to Embodiment 1 represented in FIG. 1 includes an object detection unit 1, a target inter-vehicle distance calculation unit 2, a deceleration-start inter-vehicle distance calculation unit 3, a target own-vehicle speed calculation unit 4, a road-surface gradient angle calculation unit 5, an engine-brake acceleration value calculation unit 6, an engine-brake acceleration value storage unit 7, and an own-vehicle speed calculation unit 8.

The object detection unit 1 has an object detection sensor 11 mounted in an own vehicle and detects another vehicle by receiving an electric wave (hereinafter, referred to as a "reflected wave") that is irradiated from the object detection sensor and returns thereto after reflecting on foregoing another vehicle as an object. Furthermore, based on the received reflected wave, the object detection unit 1 calculates vertical and horizontal distances between the own vehicle and foregoing another vehicle and a relative speed Vr between foregoing another vehicle and the own vehicle. As the object detection sensor 11, for example, at least one of a millimeter wave radar, a laser radar, and an ultrasound sensor is utilized; however, the object detection sensor 11 is not limited thereto.

According to the equation (1) below, the target inter-vehicle distance calculation unit 2 calculates a target inter-vehicle distance Ltarget, which is a target inter-vehicle distance between the own vehicle and preceding another vehicle at a time when the own vehicle follows foregoing preceding another vehicle.

$$Ltarget = Vfront \times T \tag{1}$$

where Vfront denotes an another-vehicle speed, which is the vehicle speed of preceding another vehicle to be followed by the own vehicle; T denotes the time that can be determined by the rider of the own vehicle and can usually be selected from two or more setting values.

Based on the relative speed Vr calculated by the object detection unit 1 and an own-vehicle speed Vown, which is the own-vehicle speed calculated by an after-mentioned own-vehicle speed calculation unit 8, the another-vehicle speed Vfront, which is the vehicle speed of the preceding another vehicle, can be calculated according to the equation (2) below.

$$Vfront = Vown + Vr \tag{2}$$

According to the equation (3) below, the deceleration-start inter-vehicle distance calculation unit 3 calculates a deceleration-start inter-vehicle distance Ldec, which is the inter-vehicle distance between the own vehicle and preceding another vehicle for starting deceleration through activation of the engine brake.

$$Ldec = [-Vr2/2 \times Adec] + Ltarget \tag{3}$$

where Adec is the acceleration value of the own vehicle. In the case of deceleration, Adec is smaller than 0. The acceleration value Adec will be described later. As the acceleration value Adec of the own vehicle, an acceleration value stored in the engine-brake acceleration value storage unit 7 is utilized. In the case where the acceleration value Adec stored in the engine-brake acceleration value storage unit 7 is the same as or larger than "0", it suggests that acceleration is performed, and hence the present disclosure is not applied to this case.

The target own-vehicle speed calculation unit 4 calculates a target own-vehicle speed Vtarget at a time when the own vehicle follows the preceding another vehicle. The target own-vehicle speed Vtarget becomes equal to the another-vehicle speed Vfront ([Vtarget=Vfront]), which is the vehicle speed of the another vehicle that is an object to be followed and is existing in front of the own vehicle.

The road-surface gradient angle calculation unit 5 has a gradient angle sensor 51 mounted in the own vehicle and calculates the gradient angle of a road surface on which the own vehicle is traveling, by use of the gradient angle sensor 51. When a road surface is slanted (slanted on a descending slope or slanted on an ascending slope), it is presumed that the own vehicle is slanted to the same extent; thus, the gradient angle of the road surface can be calculated by the gradient angle sensor 51 of the own vehicle.

The engine-brake acceleration value calculation unit 6 calculates the acceleration value Adec obtained through the engine brake of the own vehicle. The acceleration value Adec can be calculated from an after-mentioned own-vehicle speed; the calculation result is stored in the engine-brake acceleration value storage unit 7 and becomes a variable to be utilized in the deceleration-start inter-vehicle distance calculation unit 3. When the engine-brake deceleration-start inter-vehicle distance Ldec is calculated, no real-time acceleration value can be applied to the calculation equation for the deceleration-start inter-vehicle distance calculation unit 3. This is because it is presumed that at a time immediately before the own vehicle starts to decelerate while control of the drive assistance apparatus is performed, the own vehicle is traveling at a constant speed and because the real-time acceleration value cannot be calculated. Accordingly, it is required that the acceleration value Adec of the own vehicle is preliminarily calculated and stored.

The engine-brake acceleration value storage unit 7 stores the gradient angle of the road surface, calculated by the road-surface gradient angle calculation unit 5, and the acceleration value calculated by the engine-brake acceleration value calculation unit 6. The own-vehicle speed calculation unit 8 calculates the own-vehicle speed, based on a detection value from a vehicle speed sensor 81.

Figure 5:
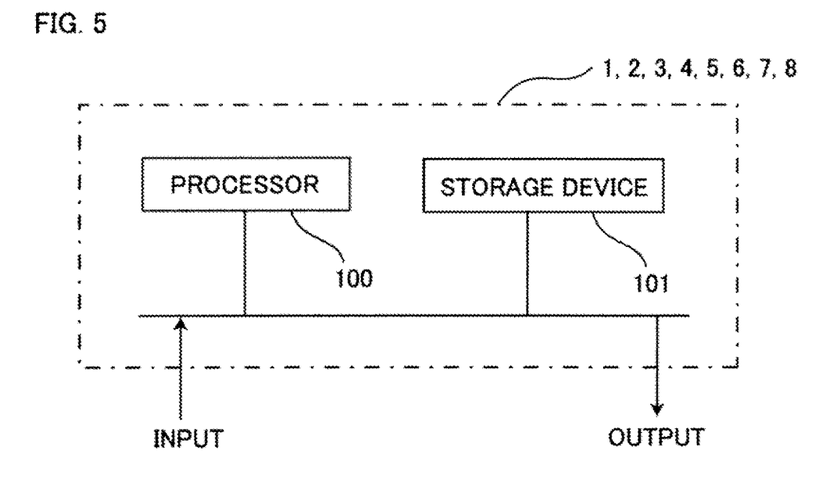
FIG. 5 is a block diagram representing a hardware configuration in the motorcycle-drive assistance apparatus according to Embodiment 1.

At least the members, other than the object detection sensor 11, the gradient angle sensor 51, and the vehicle speed sensor 81, of the motorcycle-drive assistance apparatus according to foregoing Embodiment 1 can be formed of software programs. FIG. 5 represents an example of hardware for that case. In FIG. 5, the object detection unit 1, the target inter-vehicle distance calculation unit 2, the deceleration-start inter-vehicle distance calculation unit 3, the target own-vehicle speed calculation unit 4, the road-surface gradient angle calculation unit 5, the engine-brake acceleration value calculation unit 6, the engine-brake acceleration value storage unit 7, and the own-vehicle speed calculation unit 8 are formed of a processor 100 and a storage device 101.

Although not represented, the storage device has a volatile storage device such as a RAM (Random Access Memory) and a nonvolatile auxiliary storage device such as a flash memory. Additionally, instead of the flash memory, a hard disk may be included as the auxiliary storage device. The processor 100 implements a program inputted from the storage device 101. In this case, the program is inputted from the auxiliary storage device to the processor 100 by way of the volatile storage device. Moreover, the processor 100 may output data such as a calculation result either to the volatile storage device of the storage device 101 or to the auxiliary storage device by way of the volatile storage device.

Next, the operation of the motorcycle-drive assistance apparatus according to Embodiment 1 will be explained. In FIG. 1, as described later, while the own vehicle travels, a map for the acceleration value Adec including the road-surface gradient angle and the own-vehicle speed, as the respective axes, is created based on the road-surface gradient angle calculated by the road-surface gradient angle calculation unit 5 and the own-vehicle speed calculated by the own-vehicle speed calculation unit 8. With regard to the acceleration value Adec, the own-vehicle acceleration value obtained through the engine brake is made to be a minimum acceleration value, i.e., a maximum deceleration value, so that the time in which the own vehicle decelerates can be made to be a minimum. Therefore, calculation of the acceleration value Adec is performed at a timing when at least one of the condition that the opening degree of the throttle valve is the same as or smaller than a preliminarily set value (e.g., fully closed), the condition for a fuel cut in which fuel supply to the engine is stopped, and the condition for an ignition cut in which ignition of fuel supplied to the engine is stopped has been established.

The own-vehicle acceleration value Adec obtained through the engine brake can be calculated according to the equation (3) below.

$$Adec = (Vend - Vstart)/(Tend - Tstart) \quad (3)$$

In this situation, when Adec<0, the acceleration value Adec denotes a deceleration value. Thus, the acceleration value Adec obtained through the engine brake is smaller than "0" ([Adec<0]) and denoted a deceleration value; however, in the following explanation, it will be explained as the acceleration value Adec, for the convenience of explanation. Vstart is an engine-brake-start own-vehicle speed, which is an own-vehicle speed at a time when the operation of the engine brake is started; Vend is an engine-brake-release own-vehicle speed, which is an own-vehicle speed at a time when the operation of the engine brake is released; Tstart is an engine-brake-start time instant, which is a time instant when the operation of the engine brake is started; Tend is an engine-brake-release time instant, which is a time instant when the operation of the engine brake is released.

The engine-brake-start own-vehicle speed Vstart is an own-vehicle speed at a time when at least one of the condition that the opening degree of the throttle valve is the same as or smaller than a preliminarily set value (e.g., fully closed), the condition for a fuel cut, and the condition for an ignition cut has been established. The engine-brake-release own-vehicle speed Vend is an own-vehicle speed at a time when all of the condition that the opening degree of the throttle valve is the same as or smaller than a preliminarily set value (e.g., fully closed), the condition for a fuel cut, and the condition for an ignition cut have not been established.

The engine-brake-start time instant Tstart is a time instant when at least one of the condition that the opening degree of the throttle valve is the same as or smaller than a preliminarily set value (e.g., fully closed), the condition for a fuel cut, and the condition for an ignition cut has been established and then the engine brake is started. The engine-brake-release time instant Tend is a time instant when all of the condition that the opening degree of the throttle valve is the same as or smaller than a preliminarily set value (e.g., fully closed), the condition for a fuel cut, and the condition for an ignition cut have not been established and then the operation of the engine brake is released.

The acceleration value Adec calculated according to the foregoing equation (3) by the engine-brake acceleration value calculation unit 6 is stored in the RAM of the engine-brake acceleration value storage unit 7. A RAM is a volatile memory that can temporarily store data and the memory contents in which is deleted when the power source is turned off. Provided an acceleration value to be stored in a RAM region the same as that in which an acceleration value has already been stored is calculated, the calculation result and the temporarily stored acceleration value are compared with each other; then, the smaller acceleration value (i.e., a larger deceleration value) is stored in the RAM.

The engine-brake acceleration value storage unit 7 stores the acceleration value Adec obtained through the own vehicle, which has been calculated by the engine-brake acceleration value calculation unit 6 and has temporarily been stored in the RAM, in a ROM (Read Only Memory). The ROM is formed of a nonvolatile memory such as an EEPROM (Electrically Erasable Programmable Read-Only Memory).

The acceleration value Adec that, has temporarily been stored in the RAM is stored in the ROM at the timing when the rider, as a user, turns off the key so as to cut off the power source, so that the number of cases where writing in the ROM is performed can be reduced. When the difference between an acceleration value stored in the past and an acceleration value to be stored at the present time becomes the same as or larger than a predetermined value or the same as or smaller than a predetermined value, the present data is stored in the ROM; thus, the number of the storing cases can be reduced. The reason why such processing is performed is that in general, the number of cases where writing in the ROM is performed is limited. Furthermore, it is desirable that assuming that a region where no own-vehicle acceleration value Adec is calculated may occur, respective initial values are preliminarily set in all the regions. The regions will be described later.

Figure 2:
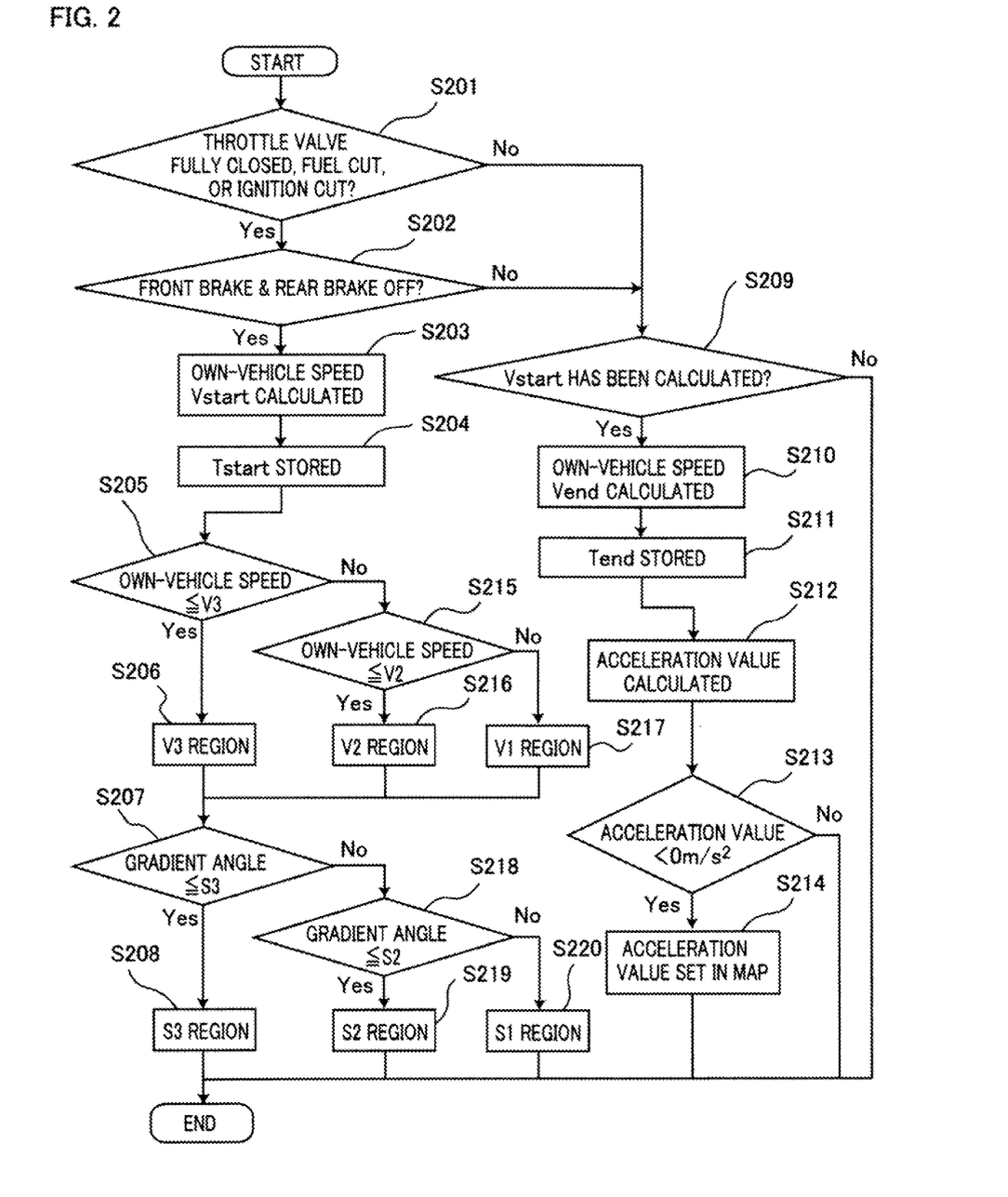
FIG. 2 is a flowchart representing a procedure for calculating an acceleration value obtained through an own-vehicle engine brake in the motorcycle-drive assistance apparatus according to Embodiment 1.

FIG. 2 is a flowchart representing a procedure for calculating the acceleration value obtained through the own-vehicle engine brake in the motorcycle-drive assistance apparatus according to Embodiment 1. In FIG. 2, it is determined in the step S201 whether or not at least one of the condition that the opening degree of the throttle valve is the same as or smaller than a preliminarily set value (e.g., fully closed), the condition for a fuel cut, and the condition for an ignition cut has been established; in the case where it is determined that at least one of the condition that the opening degree of the throttle valve is the same as or smaller than a preliminarily set value (e.g., fully closed), the condition for a fuel cut, and the condition for an ignition cut has been established, the step S201 is followed by the step S202.

In the step S202, it is determined whether or not the front, brake is off and the rear brake is off. That is to say, in the steps S201 and S202, it is determined whether or not the present driving situation is the one where the engine brake can function. In the case where it is determined in the step S202 that both the front brake and the rear brake are off (YES), the step S202 is followed by the step S203, where the engine-brake-start own-vehicle speed Vstart is calculated.

Subsequently, in the step S204, the engine-brake-start time instant Tstart is stored in the memory. Then, in the step S205, it is determined whether or not the engine-brake-start own-vehicle speed Vstart is the same as or smaller than a third vehicle speed V3 as a preliminarily set threshold value; in the case where the engine-brake-start own-vehicle speed Vstart is the same as or smaller than the third vehicle speed V3 (Yes), the step S205 is followed by the step S206, where it is stored that the engine-brake-start own-vehicle speed Vstart belongs to the region of the third vehicle speed V3; then, the S206 is followed by the step S207.

In contrast, in the case where it is determined in the step S205 that the engine-brake-start own-vehicle speed Vstart is larger than the third vehicle speed V3 (NO), the step S205 is followed by the step S215, where it is determined whether or not the engine-brake-start own-vehicle speed Vstart is the same as or smaller than a second vehicle speed V2 as a preliminarily set threshold value; in the case where the engine-brake-start own-vehicle speed Vstart is the same as or smaller than the second vehicle speed V2 (Yes), the step S215 is followed by the step S206. In the step S216, it is stored that the engine-brake start own-vehicle speed Vstart belongs to the region of the second vehicle speed V2; then, the S216 is followed by the step S207. In the case where it is determined in the step S215 that the engine-brake-start own-vehicle speed Vstart is larger than the second vehicle speed V2 (NO), the step S215 is followed by the step S217, where it is stored that the engine-brake-start own-vehicle speed Vstart belongs to the region of a first vehicle speed V1 as a preliminarily set threshold value; then, the step S217 is followed by the step S207. In this situation, the inequality [V3<V2<V1] is established.

Subsequently, the region of a road-surface gradient angle is determined. That is to say, it is determined in the step S207 whether or not the present road-surface gradient angle is the same as or smaller than a third gradient angle S3 as a preliminarily set threshold value; in the case where the present road-surface gradient angle is the same as or smaller than the third gradient angle S3 (Yes), the step S207 is followed by the step S208, where it is stored that the present road-surface gradient angle belongs to the region of the third gradient angle S3. In contrast, in the case where it is determined in the step S207 that the road-surface gradient angle is larger than the third gradient angle S3 (No), the step S207 is followed by the step S218, where it is determined whether or not the present road-surface gradient angle is the same as or smaller than a second gradient angle S2 as a preliminarily set threshold value; in the case where the present road surface gradient angle is the same as or smaller than the second gradient angle S2 (Yes), the step S218 is followed by the step S219, where it is stored that the present road-surface gradient angle belongs to the region of the second gradient angle S2. In contrast, in the case where it is determined in the step S218 that the present road-surface gradient angle is larger than the second gradient angle S2 (No), the step S218 is followed by the step S220, where it is stored that the present road-surface gradient angle belongs to the region of a first gradient angle S1 as a preliminarily set threshold value. In this situation, the inequality [S3<S2<S1] is established.

Meanwhile, in the case where the determination result of any one of the steps S201 and S202 is negative (No), it is determined that the engine brake is not working; then, the step S209 is started. In the step S209, it is determined whether or not the engine-brake-start own-vehicle speed Vstart has been calculated in the step S203; in the case where it is determined that the engine-brake-start own-vehicle speed Vstart has been calculated (Yes), the step S209 is followed by the step S210. In the step S210, the engine-brake-release own-vehicle speed Vend, which is an own-vehicle speed at a time when the operation of the engine brake has been released, is calculated; then, the step S210 is followed by the step S211.

In the step S211, the engine-brake-release time instant Tend, which is a time instant when the operation of the engine brake has been released, is calculated and stored in the memory; then, the step S211 is followed by the step S212. In the step S212, based on the engine-brake-start own-vehicle speed Vstart calculated in the step S203, the engine-brake-start time instant Tstart stored in the step S204, the engine-brake-release own-vehicle speed Vend calculated in the step S210, and the engine-brake-release time instant Tend stored in the step S211, the own-vehicle acceleration value Adec, i.e., the average value of acceleration values at a time when the engine brake is working, is calculated according to the foregoing equation (3).

Next, in the step S213, it is determined whether or not the calculated acceleration value is smaller than $0 \ [m/s^2]$; in the case where the calculated acceleration value is smaller than $0 \ [m/s^2]$ (Yes), it is determined that the calculated acceleration value is a deceleration value; then, the step S213 is followed by the step S214. In the step S214, the acceleration value calculated in the step S212 is set in an acceleration-value map, as described later; then, the processing is ended.

In contrast, in the case where it is determined in the step S209 that the engine-brake-start own-vehicle speed Vstart has not calculated (No), the processing is ended. In the case where it is determined in the step S213 that the acceleration value is not smaller than $0 \ [m/s^2]$ (No), it is determined that the acceleration value calculated in the step S212 is not a deceleration value; then, the processing is ended. The processing represented in FIG. 2 is periodically repeated in a predetermined time interval.

Here, the processing, in the step S214, of setting the acceleration value in the acceleration-value map will be explained. As described above, based on the determinations on the engine-brake-start own-vehicle speed Vstart in the steps S205 and S215, it has been stored that the presently calculated engine-brake-start own-vehicle speed Vstart belongs to any one of the third vehicle speed V3, the second vehicle speed V2, and the first vehicle speed V1; in addition, based on the determinations on the road-surface gradient angle in the steps S207 and S218, it has been stored that the present road-surface gradient angle belongs to any one of the third gradient angle S3, the second gradient angle S2, and the first gradient angle S1. Accordingly, in the step S214, the present acceleration value Adec is set in a region where the vehicle-speed region to which the presently calculated engine-brake-start own-vehicle speed Vstart belongs and the gradient-angle region to which the present road-surface gradient angle belongs coincide with each other.

Figure 3:
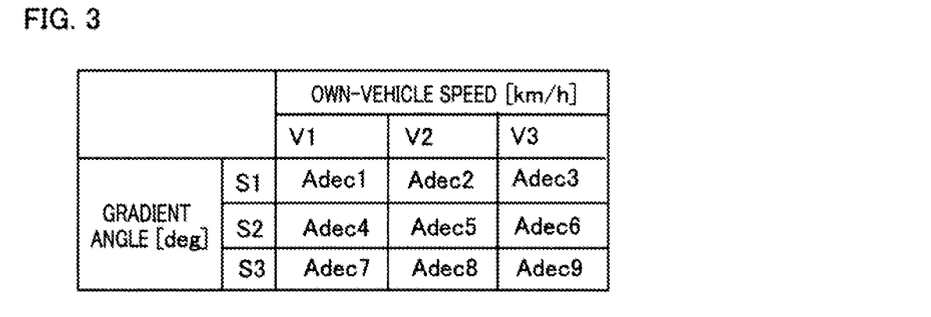
FIG. 3 is an explanatory table representing an acceleration-value map in which acceleration values obtained through the own-vehicle engine brake are stored in the motorcycle-drive assistance apparatus according to Embodiment 1.

FIG. 3 is an explanatory table representing an acceleration-value map in which acceleration values obtained through the own-vehicle engine brake are stored in the motorcycle-drive assistance apparatus according to Embodiment 1. In the acceleration-value map in FIG. 3, the abscissa denotes the respective regions of the first vehicle speed V1, the second vehicle speed V2, and the third vehicle speed V3 in the own-vehicle speed [km/h]; the ordinate denotes the respective regions of the first gradient angle S1, the second gradient angle S2, and the third gradient angle S3 in the gradient angle [deg]. The acceleration-value map in FIG. 3 indicates a state where for example, acceleration values calculated in the past are stored as Adec1 through Adec9 in the respective regions corresponding to the values.

Here, in the foregoing step S214, in the case where it is determined that as described later, [calculation result≥map value×K1] and [calculation result≤map value×K2] are not established in the region where the vehicle-speed region to which the present engine-brake-start own-vehicle speed Vstart belongs and the gradient-angle region to which the present road-surface gradient angle belongs coincide with each other, the present acceleration value Adec (i.e., deceleration value) obtained through the engine brake, calculated in the step S212, is stored in the foregoing region.

In the acceleration-value map in FIG. 3, each of the vehicle-speed region in the abscissa and the gradient-angle region in the ordinate is divided into three divisions; however, the number of divisions can arbitrarily be set. Moreover, each of the foregoing respective threshold values for setting the region of the first vehicle speed V1, the region of the second vehicle speed V2, the region of the third vehicle speed V3, the region of the first gradient angle S1, the region of the second gradient angle S2, and the region of the third gradient angle S3 can arbitrarily be set. An acceleration value changes depending on whether the road is flat or slanted; therefore, it is required that the map has an axis of the gradient angle.

Figure 4:
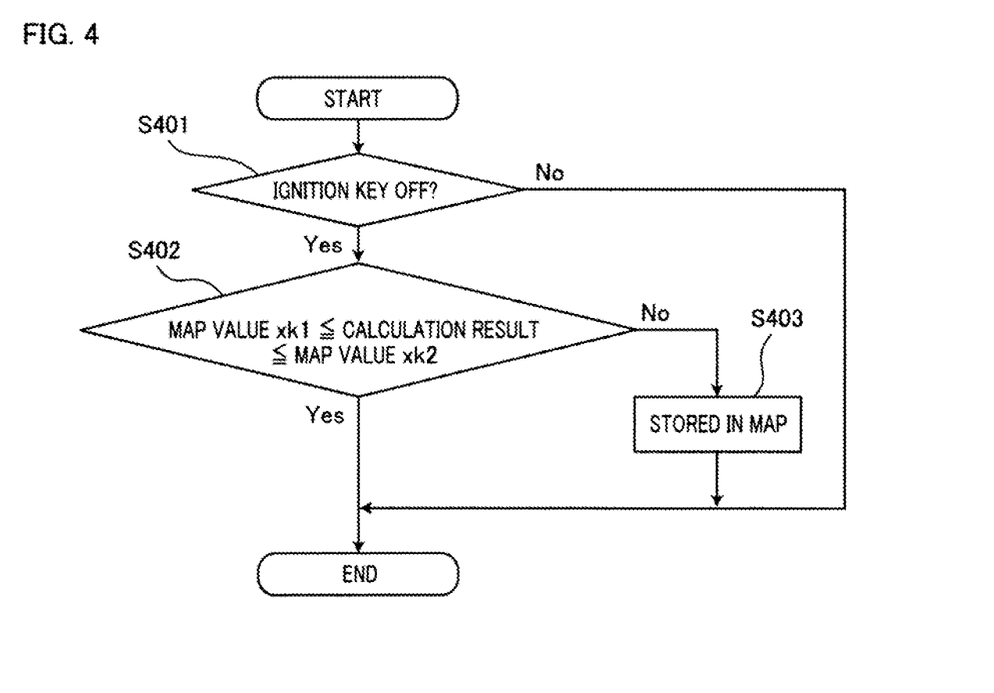
FIG. 4 is a flowchart representing a timing of storing the acceleration value obtained through the own-vehicle engine brake in the motorcycle-drive assistance apparatus according to Embodiment 1.

FIG. 4 is a flowchart representing a timing of storing the acceleration value obtained through the own-vehicle engine brake in the motorcycle-drive assistance apparatus according to Embodiment 1. In FIG. 4, in the step S401, it is determined whether or not the ignition key of the own vehicle is off; in the case where the ignition key of the own vehicle is off (Yes), the step S401 is followed by the step S402. In the step S402, the acceleration-value data already stored in the acceleration-value map in FIG. 3 and the present acceleration value calculated in the step S212 in FIG. 2 are compared with each other, and it is determined whether or not [calculation result≥map value×K1] and [calculation result≤map value×K2] are established. Here, each of K1 and K2 is a coefficient that can arbitrarily be set.

In the case where it is determined in the step S402 that [calculation result≥map value×K1] and [calculation result-≤map value×K2] are established (Yes), the processing is ended; in the case where [calculation result≥map value×K1] and [calculation result≤map value×K2] are not established (No), the step S402 is followed by the step S403, where the presently calculated acceleration value is stored in the corresponding region of the map in FIG. 3. Because based on the determination in the step S402, it is determined whether or not an acceleration value can be stored in the map, it is made possible to prevent the acceleration value from being excessively stored in the ROM.

As a whole, the motorcycle-drive assistance apparatus according to Embodiment 1 represented in FIG. 1 operates as follows. At first, the object detection unit 1 detects another vehicle existing in front of the own vehicle, in such a manner as described above; then, according to the foregoing equation (1), the target inter-vehicle distance calculation unit 2 calculates a target inter-vehicle distance between the own vehicle and the preceding another vehicle. Then, while the present driving condition is the one where the engine brake can be operated, the own-vehicle speed calculation unit 8 detects the engine-brake-start own-vehicle speed and the road-surface gradient, angle calculation unit 5 detects the gradient angle of a road surface on which the own vehicle is currently traveling; furthermore, the engine-brake acceleration value calculation unit 6 calculates the acceleration value obtained through the engine brake of the own vehicle according to the equation (3). Then, at the foregoing timing, the calculated acceleration value is stored in the corresponding region in the foregoing acceleration-value map, to which the present engine-brake-start own-vehicle speed and the present road-surface gradient angle belong. In such a way as described above, there is formed an acceleration-value map in which calculated acceleration values are preliminarily stored in the respective own-vehicle speed regions and the respective gradient angle regions.

As described above, the acceleration value stored in the acceleration-value map of the engine-brake acceleration value storage unit 7 becomes a variable to be utilized in the deceleration-start inter-vehicle distance calculation unit 3. As described above, when the engine-brake deceleration-start inter-vehicle distance is calculated, no real-time acceleration value can be applied to the calculation equation for the deceleration-start inter-vehicle distance calculation unit 3. Accordingly, as described above, acceleration values of the own vehicle are preliminarily calculated and stored in the acceleration-value map; the acceleration value stored in a region of the acceleration-value map, to which the present engine-brake-start own-vehicle speed and road-surface gradient angle belong, is read and utilized in the calculation of the deceleration-start inter-vehicle distance. Then, when the inter-vehicle distance between the own vehicle and the preceding another vehicle becomes smaller than the deceleration-start inter vehicle distance, deceleration is started through the engine brake.

The acceleration value stored in the acceleration-value map is to cause the own-vehicle acceleration value obtained through the engine brake to become a minimum acceleration value, i.e., a maximum deceleration value, so that the time in which the own vehicle decelerates can be made minimum.

In the motorcycle-drive assistance apparatus according to Embodiment 1, braking control unintended by a rider is not performed and deceleration is performed by the engine brake at a large deceleration value, so that it is made possible to maintain the inter-vehicle distance from the another vehicle in a short deceleration time.

The motorcycle-drive assistance apparatus according to Embodiment 1 can appropriately be modified or partially be omitted.

What is claimed is:

1. A motorcycle-drive assistance apparatus that assists a motorcycle to follow another vehicle existing in front thereof, comprising:
   an object detector that detects said another vehicle;
   a road-surface gradient angle calculator that calculates a gradient angle of a road-surface on which the motorcycle is traveling;
   a motorcycle speed calculator that calculates a motorcycle speed, which is a vehicle speed of the motorcycle;
   an engine-brake acceleration value calculator that calculates an acceleration value of the motorcycle, obtained through an engine brake, at a time of a driving state where the motorcycle can operate the engine brake;
   a deceleration-start inter-vehicle distance calculator that calculates a deceleration-start inter-vehicle distance between the motorcycle and said another vehicle at a time when the motorcycle starts to decelerate through the engine brake; and an engine-brake acceleration value memory that stores an acceleration value calculated by the engine-brake acceleration value calculator, wherein the deceleration-start inter-vehicle distance calculator reads an acceleration value corresponding to a motorcycle speed calculated by the motorcycle speed calculator and a gradient angle calculated by the road-surface gradient angle calculator from the engine-brake acceleration value memory and then calculates the deceleration-start inter-vehicle distance based on the acceleration value read from the engine-brake acceleration value memory, and wherein when an inter-vehicle distance between the motorcycle and said another vehicle becomes smaller than the deceleration-start inter-vehicle distance calculated by the deceleration-start inter-vehicle distance calculator, deceleration of the motorcycle through the engine brake is started.

2. The motorcycle-drive assistance apparatus according to claim 1, wherein the motorcycle can operate the engine brake in a driving state where at least one of a condition that an opening degree of a throttle valve of the motorcycle is the same as or smaller than a preliminarily set value, a condition for a fuel cut in which fuel to be supplied to an engine of the motorcycle is stopped, and a condition for an ignition cut in which ignition of fuel supplied to the engine of the motorcycle is stopped has been established.

3. The motorcycle-drive assistance apparatus according to claim 2, wherein based on a speed difference between an engine-brake-start motorcycle speed, which is a motorcycle speed at a time when operation of the engine brake is started, and an engine-brake-release own-vehicle speed, which is a motorcycle speed at a time when operation of the engine brake is released, and based on a time between an engine-brake-start time instant, which is a time instant when operation of the engine brake is started, and an engine-brake-release time instant, which is a time instant when operation of the engine brake is released, the engine-brake acceleration value calculator calculates an acceleration value of the motorcycle, obtained through the engine brake.

4. The motorcycle-drive assistance apparatus according to claim 3, wherein the engine-brake acceleration value memory is provided with an acceleration-value map having two or more regions for segmenting the own-vehicle speeds and the gradient angles by respective threshold values and stores an acceleration value calculated by the engine-brake acceleration value calculator in the region to which a motorcycle speed calculated by the motorcycle speed calculator and a gradient angle calculated by the road-surface gradient angle calculator belong.

5. The motorcycle-drive assistance apparatus according to claim 4, wherein the engine-brake acceleration value memory stores an acceleration value calculated by the engine-brake acceleration value calculator when off-operation of an ignition key of the motorcycle is performed.

6. The motorcycle-drive assistance apparatus according to claim 3, wherein the engine-brake acceleration value memory stores an acceleration value calculated by the engine-brake acceleration value calculator when off-operation of an ignition key of the motorcycle is performed.

7. The motorcycle-drive assistance apparatus according to claim 2, wherein the engine-brake acceleration value memory is provided with an acceleration-value map having two or more regions for segmenting the motorcycle speeds and the gradient angles by respective threshold values and stores an acceleration value calculated by the engine-brake acceleration value calculator in the region to which a motorcycle speed calculated by the motorcycle speed calculator and a gradient angle calculated by the road-surface gradient angle calculator belong.

8. The motorcycle-drive assistance apparatus according to claim 7, wherein the engine-brake acceleration value memory stores an acceleration value calculated by the engine-brake acceleration value calculator when off-operation of an ignition key of the motorcycle is performed.

9. The motorcycle-drive assistance apparatus according to claim 2, wherein the engine-brake acceleration value memory stores an acceleration value calculated by the engine-brake acceleration value calculator when off-operation of an ignition key of the motorcycle is performed.

10. The motorcycle-drive assistance apparatus according to claim 1, wherein based on a speed difference between an engine-brake-start own-vehicle speed, which is a motorcycle speed at a time when operation of the engine brake is started, and an engine-brake-release own-vehicle speed, which is a motorcycle speed at a time when operation of the engine brake is released, and based on a time between an engine-brake-start time instant, which is a time instant when operation of the engine brake is started, and an engine-brake-release time instant, which is a time instant when operation of the engine brake is released, the engine-brake acceleration value calculator calculates an acceleration value of the motorcycle, obtained through the engine brake.

11. The motorcycle-drive assistance apparatus according to claim 10, wherein the engine-brake acceleration value memory is provided with an acceleration-value map having two or more regions for segmenting the motorcycle speeds and the gradient angles by respective threshold values and stores an acceleration value calculated by the engine-brake acceleration value calculator in the region to which a motorcycle speed calculated by the motorcycle speed calculator and a gradient angle calculated by the road-surface gradient angle calculator belong.

12. The motorcycle-drive assistance apparatus according to claim 11, wherein the engine-brake acceleration value memory stores an acceleration value calculated by the engine-brake acceleration value calculator when off-operation of an ignition key of the motorcycle is performed.

13. The motorcycle-drive assistance apparatus according to claim 10, wherein the engine-brake acceleration value memory stores an acceleration value calculated by the engine-brake acceleration value calculator when off-operation of an ignition key of the motorcycle is performed.

14. The motorcycle-drive assistance apparatus according to claim 1, wherein the engine-brake acceleration value memory is provided with an acceleration-value map having two or more regions for segmenting the motorcycle speeds and the gradient angles by respective threshold values and stores an acceleration value calculated by the engine-brake acceleration value calculator in the region to which a motorcycle speed calculated by the own-vehicle speed calculator and a gradient angle calculated by the road-surface gradient angle calculator belong.

15. The motorcycle-drive assistance apparatus according to claim 14, wherein the engine-brake acceleration value memory stores an acceleration value calculated by the engine-brake acceleration value calculator when off-operation of an ignition key of the motorcycle is performed.

16. The motorcycle-drive assistance apparatus according to claim 1, wherein the engine-brake acceleration value memory stores an acceleration value calculated by the engine-brake acceleration value calculator when off-operation of an ignition key of the motorcycle is performed.

17. The motorcycle-drive assistance apparatus according to claim 1, wherein the acceleration value of the motorcycle, obtained through the engine brake, is configured to not spill a rider of the motorcycle, and the motorcycle comprises the motorcycle-drive assistance apparatus.

18. The motorcycle-drive assistance apparatus according to claim 17, wherein the deceleration through the engine brake is started without a preliminary detection that the rider has grasped both handle grips of the motorcycle.

\* \* \* \* \*